US007007286B2

(12) United States Patent
Suzuki et al.

(10) Patent No.: US 7,007,286 B2
(45) Date of Patent: Feb. 28, 2006

(54) DISK MECHANISM

(75) Inventors: Toru Suzuki, Saitama (JP); Hironobu Kobayashi, Saitama (JP)

(73) Assignee: Pioneer Corporation, Tokyo (JP)

( * ) Notice: Subject to any disclaimer, the term of this patent is extended or adjusted under 35 U.S.C. 154(b) by 145 days.

(21) Appl. No.: 10/464,446

(22) Filed: Jun. 19, 2003

(65) Prior Publication Data

US 2004/0001416 A1 Jan. 1, 2004

(30) Foreign Application Priority Data

Jun. 28, 2002 (JP) .......................... P2002-189885

(51) Int. Cl.
*G11B 17/04* (2006.01)

(52) U.S. Cl. ...................................................... 720/628

(58) Field of Classification Search ................ 720/628, 720/617, 619, 620, 627, 646, 647, 622, 623, 720/615; 360/99.02, 99.06; 369/77.11
See application file for complete search history.

(56) References Cited

U.S. PATENT DOCUMENTS

| | | | | |
|---|---|---|---|---|
| 5,119,354 | A * | 6/1992 | Umesaki | 369/30.9 |
| 6,009,062 | A * | 12/1999 | Nashimoto et al. | 720/628 |
| 6,314,073 | B1 * | 11/2001 | Horie | 720/628 |
| 6,388,974 | B1 * | 5/2002 | Kato | 720/627 |

FOREIGN PATENT DOCUMENTS

| | | | |
|---|---|---|---|
| EP | 391424 | A2 * | 10/1990 |
| JP | 09062402 | A * | 3/1997 |
| JP | 2002008356 | A * | 1/2002 |

* cited by examiner

*Primary Examiner*—Tianjie Chen
(74) *Attorney, Agent, or Firm*—Sughrue Mion, PLLC

(57) ABSTRACT

The attaching section 3 is arranged on the panel member 2 under the condition that center SC of the disk insertion hole 2*a* in the longitudinal direction and center MC of the disk 8 attached to the attaching section 3 are dislocated from each other in the longitudinal direction of the disk insertion hole 2*a*. The guide device 11 for guiding the disk 8 toward attaching position FP of the attaching section 3 is provided at an end portion of the disk insertion hole 2*a* in the longitudinal direction.

10 Claims, 3 Drawing Sheets

DISK MECHANISM

The present disclosure relates to the subject matter contained in Japanese Patent Application No. 2002-189885 filed on Jun. 28, 2002, which is incorporated herein by reference in its entirety.

BACKGROUND OF THE INVENTION

1. Field of the Invention

The present invention relates to a disk mechanism to which a disk, such as a compact disk (CD) or a digital versatile disk (DVD) can be attached.

2. Description of the Related Art

In a disk mechanism to which a disk such as CD or DVD can be attached, the disk is inserted into or ejected from a substantially slit-shaped disk insertion hole provided on a panel member. Conventionally, it is common that the disk insertion hole and the attaching section to which the disk is attached are arranged so that a center of the disk insertion hole in the longitudinal direction and a center of the attaching section of the disk mechanism are made to coincide with each other.

From the viewpoint of an artistic design, the disk insertion hole provided on an operation panel is made into a profile symmetrical to the right and left, because the symmetrical profile can provide a sense of stability. In many cases, the attaching section is arranged at a position where the attaching section can be appropriately installed in the layout of the entire device. Therefore, the center of the attaching section cannot always be arranged at a position where the center of the attaching section coincides with the center of the disk insertion hole.

In the case where it is difficult to arrange the attaching section in such a manner that the center of the disk insertion hole and the center of the disk, which is attached at the attaching section, coincide with each other, the prior art has such a problem that the disk insertion hole can not be arranged symmetrically to the right and left with respect to the panel member. The above problem is an example to be solved by the present invention.

SUMMARY OF THE INVENTION

In order to achieve the above object, according to a first aspect of the invention, there is provided a disk mechanism including: a panel member having a substantially slit-shaped disk insertion hole through which a disk can be inserted from a surface side to a back side; and an attaching section including an attaching position to which the inserted disk is to be attached, arranged on a backside of the panel member, wherein the attaching section is attached to the panel member under the condition that a center of the disk insertion hole in the longitudinal direction and a center of the disk attached to the attaching section, are dislocated from each other in the longitudinal direction of the disk insertion hole, the disk mechanism further including a guide device for guiding the disk toward the attaching position of the attaching section according to the insertion of the disk.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, an embodiment of the invention will be explained in detail as follows.

Figure 1:
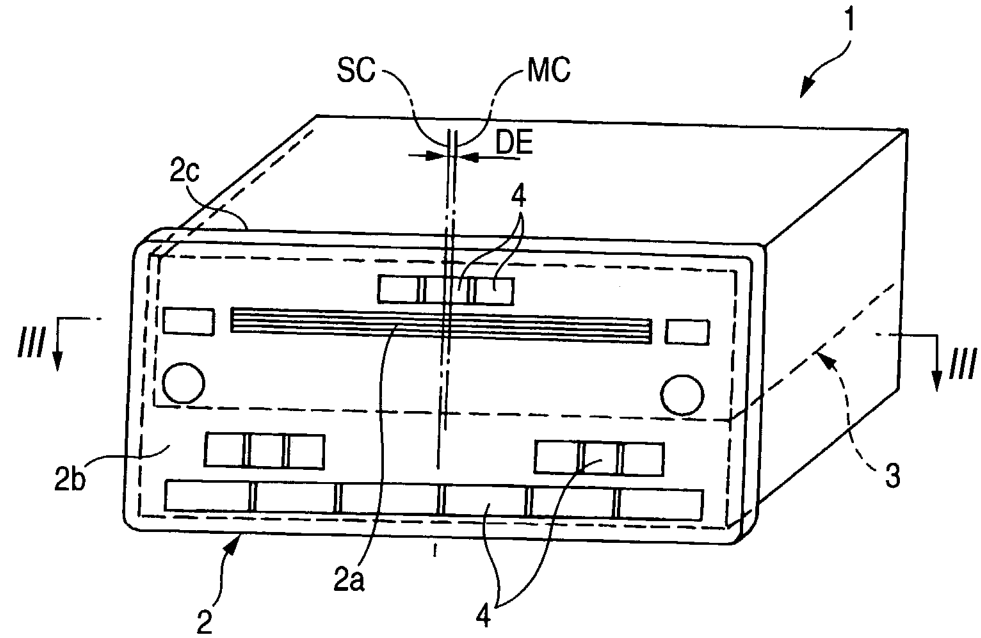
FIG. 1 is a perspective view showing a disk mechanism.
Figure 2:
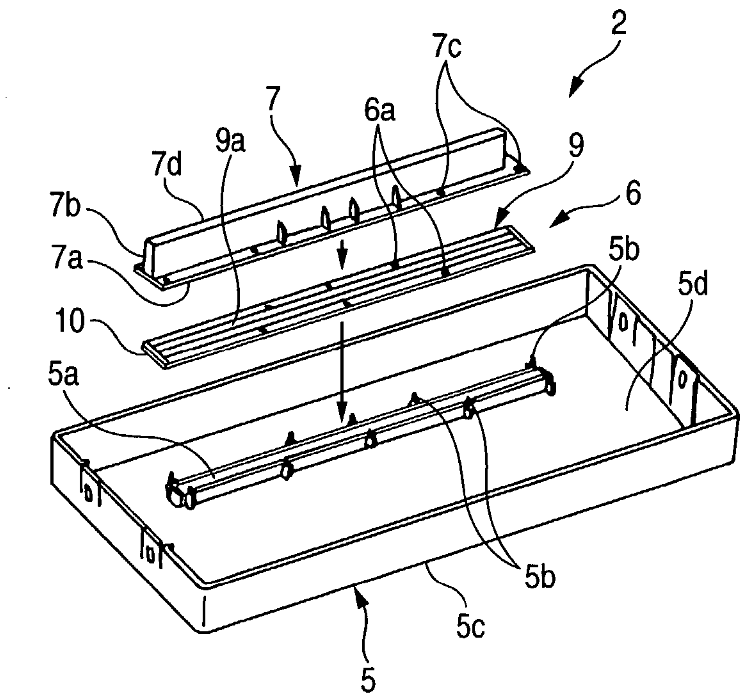
FIG. 2 is an exploded perspective view showing a panel member, wherein the view is taken from the backside.
Figure 3:
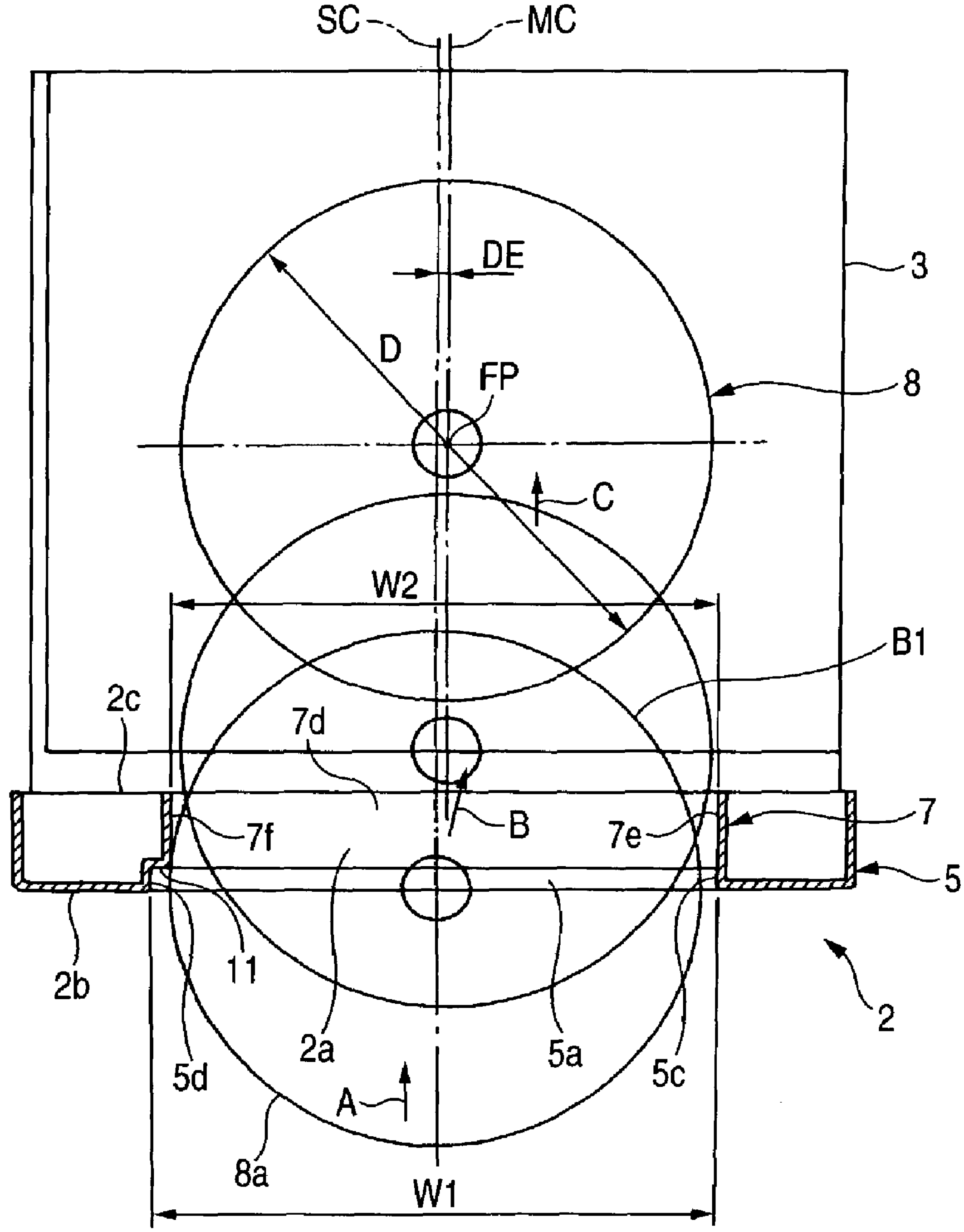
FIG. 3 is a lateral sectional view taken on line III—III in FIG. 1 showing a state of inserting a disk.
Figure 4:
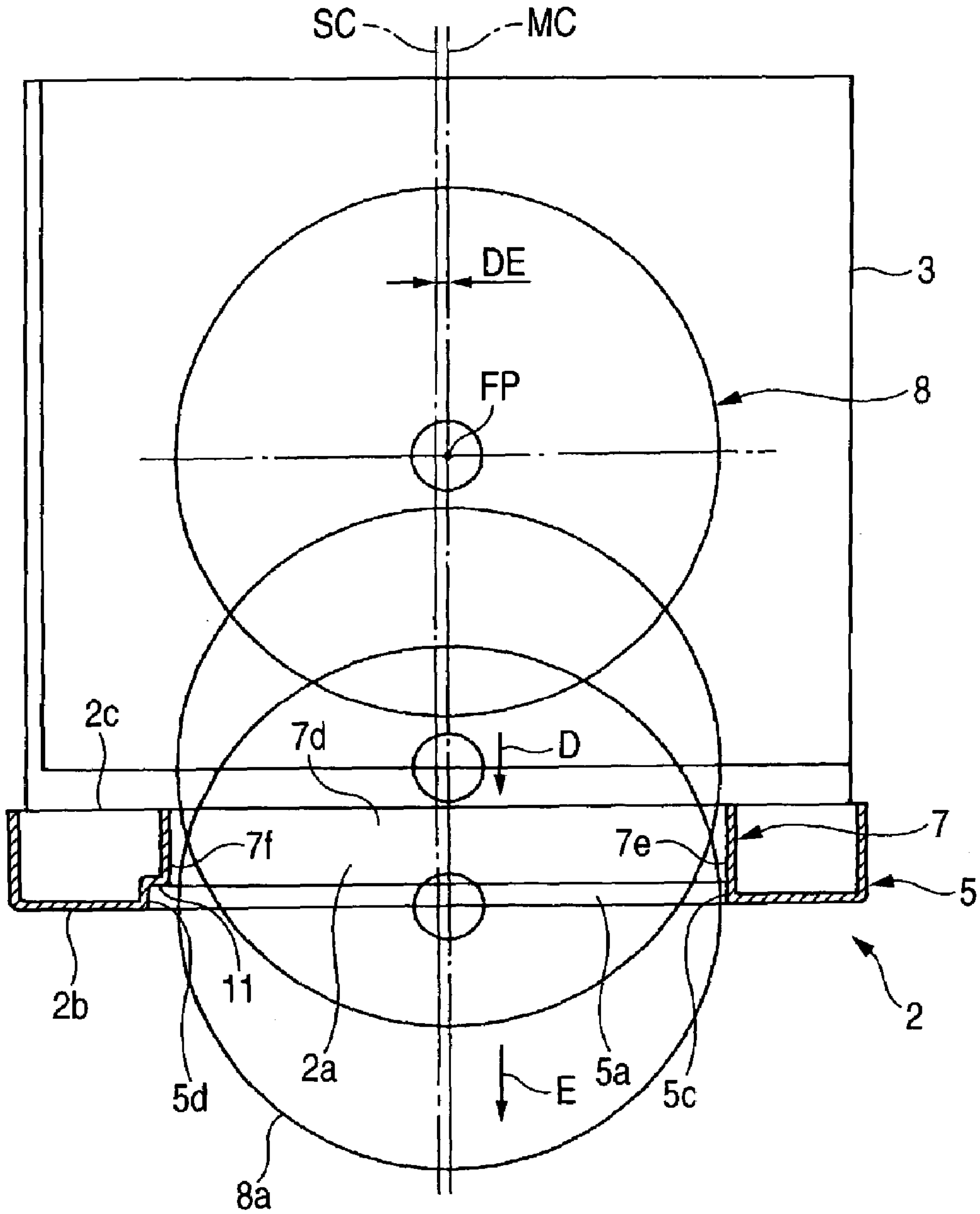
FIG. 4 is a lateral sectional view taken on line III—III in FIG. 1 showing a state of ejecting a disk from an attaching section.

FIG. 1 is a perspective view of a disk mechanism, FIG. 2 is an exploded perspective view of the panel member, wherein the view is taken from the back side, FIG. 3 is a lateral sectional view taken on line III—III in FIG. 1 showing a state of inserting a disk, and FIG. 4 is a lateral sectional view taken on line III—III in FIG. 1 showing a state of ejecting a disk from the attaching section.

As shown in FIG. 1, the disk apparatus 1 of the embodiment of the present invention includes: a panel member 2; and an attaching section 3, wherein the panel member 2 is fixed on a front face of the attaching section 3. On the panel member 2, there is provided a slit-shaped disk insertion hole 2*a* penetrating the panel member 2 from the surface side 2*b* to the backside 2*c*. The slit-shaped disk insertion hole 2*a* is arranged symmetrically to the right and left with respect to the profile of the panel member 2.

The panel member 2 and the attaching section 3 are assembled to each other in such a manner that center SC of the disk insertion hole 2*a* in the longitudinal direction is dislocated in the longitudinal direction of the disk insertion hole 2*a* by a distance DE of dislocation from center MC of the disk 8 attached to the attaching section 3.

As shown in FIGS. 1 and 2, the panel member 2 is provided so that the disk 8 such as CD or DVD can be inserted into or ejected from the disk insertion hole 2*a*. Arranged on the front face panel member 2 includes: various operation buttons 4, a panel 5, a dust cover 6 and a disk insertion hole member 7.

The panel 5 is a substantially rectangular box-shaped member made of synthetic resin by means of injection molding. On the panel 5, there is provided a slit-shaped opening section 5*a* penetrating the panel 5 from the surface 5*c* side to the back 5*d* side. This slit-shaped opening section 5*a* is formed symmetrically to the right and left with respect to the profile. As shown in FIG. 3, inner width W1 of the opening section 5*a* is set at a value obtained when an allowance is added to (outer diameter D of the disk 8+dislocation DE). For example, inner width W1 of the opening section 5*a* is set at 128 mm. Height of the opening section 5*a* is set at a value obtained when an allowance is added to thickness of the disk 8. For example, height of the opening section 5*a* is set at 5 mm. In the periphery of the opening section 5*a* on the backside 5*d*, there are provided a plurality of pins 5*b* protruding as shown in FIG. 2.

As shown in FIG. 2, the dust cover 6 is provided so that foreign objects such as dust cannot get into the disk mechanism from the outside. The dust cover 6 includes: a reinforcement plate 9, at the center of which the rectangular hole 9*a*, which is larger than outer diameter D of the disk 8, is formed; and non-woven fabric or felt 10 is fixed to the reinforcement plate 9 by means of adhesion.

At a position opposing to the rectangular hole 9*a* of non-woven fabric or felt 10, there is provided a cutout portion, the length of which is longer than outer diameter D of the disk 8. At positions on the dust cover 6 corresponding to the plurality of pins 5*b* on the panel 5, there are provided a plurality of holes 6*a*.

The disk insertion hole member 7, which is made of synthetic resin by means of injection molding, is provided so that the disk 8 can be guided to the attaching section 3. The disk insertion hole member 7 is composed in such a manner that the duct-shaped guide section 7*b* rises from the plane section 7*a* attached to the panel 5. In the plane section 7*a*, there are provided holes 7*c* at positions corresponding to the pins 5*b* attached to the panel 5.

As shown in FIG. 3, inner width W2 of the slit opening section 7*d* formed in the duct-shaped guide section 7*b* is a little larger than outer diameter D of the disk 8, and height of the slit opening section 7*d* is a little larger than thickness of the disk 8. For example, width of the slit opening section 7*d* of the disk insertion hole member 7 for CD is approximately 123 mm, and height is approximately 2.5 mm.

As shown in FIG. 2, the panel member 2 is assembled while the dust cover 6 is being interposed between the panel 5 and the disk insertion hole member 7 after the pins 5*b* of the panel 5 have been inserted into the holes 6*a* of the dust cover 6 and the holes 7*c*of the disk insertion hole member 7 and then end portions of the pins 5*b* are thermally melted.

The disk insertion hole member 7 is not necessarily assembled by means of thermal melting. For example, two or three pins 5*b* are left so that they can be used for positioning, and other pins are replaced with holes for screwing, and screws are inserted into these holes for screwing, so that the disk insertion hole member 7 can be assembled.

As shown in FIG. 3, in the assembled state, one end 7*e* of the slit opening section 7*d* in the longitudinal direction and one end 5*c* of the opening section 5*a* in the longitudinal direction are arranged on the same plane, so that one end portion of the disk insertion hole 2*a* can be formed.

Accordingly, at the other end portion of the disk insertion hole 2*a*, the other end portion 7*f* of the slit opening section 7*d* and the other end portion 5*d* of the opening section 5*a* compose a step portion 11 which is used as a guide device.

The disk insertion hole member 7 is a member different from the panel 5. When the disk insertion hole member 7 is assembled to the panel 5, the operation panel 2 is composed. Therefore, it is possible to attach the disk insertion hole member 7 even to the disk mechanism, the dislocation DE of the attaching section 3 with respect to the panel member 2 of which is different, when only the panel 5 is replaced.

As shown in FIG. 3, when the disk 8 is inserted into the disk insertion hole 2*a* in the direction of arrow A, the outer circumferential section 8*a* of the disk 8 comes into contact with the step section 11. When the disk 8 is further inserted, a drawing mechanism (not shown) arranged in the attaching section 3 is operated, and the disk 8 is held by a pair of rotating rollers (not shown) of the drawing mechanism, so that the disk 8 can be drawn onto the back side 2*c* of the panel member 2.

At this time, concerning the disk 8, the outer circumferential section 8*a* is guided by the step section 11, which is a guide device. While the disk 8 is being dislocated in the longitudinal direction (right in FIG. 3) of the disk insertion hole 2*a*, the disk 8 advances, that is, the disk 8 is moved to a diagonally right upper direction (in the direction of arrow B).

When the disk 8 passes through the slit opening section 7*d* of the disk insertion hole member 7, the outer circumferential section 8*a* of the disk 8 slides on both end portions 7*e*, 7*f* of the slit opening section 7*d*, and the disk 8 is positioned in the longitudinal direction of the disk insertion hole 2*a* at the position (position B1 shown in FIG. 3) where the attaching section 3 starts drawing the disk 8.

The disk 8 is further conveyed in the direction of arrow C and attached at attaching position FP.

Due to the above structure, even when center MC of the disk 8 at attaching position FP of the attaching section 3 and center SC of the disk insertion hole 2*a* in the longitudinal direction are dislocated from each other, the position of the disk 8 in the longitudinal direction can be automatically corrected to the position (position B1 shown in FIG. 3) where the attaching section 3 starts drawing the disk 8 after the disk 8 has inserted. Therefore, the disk 8 can be attached at attaching position FP of the attaching section 3.

Therefore; even in the case where the attaching section 3 can not be arranged in such a manner that the center of the attaching section 3 coincides with the center of the panel member 2 for the reason of designing the layout, the disk insertion hole 2*a* can be arranged symmetrically to the right and left with respect to the panel member 2, and the device can be designed with a sense of stability. Therefore, the degree of freedom of designing can be enhanced.

As shown in FIG. 4, in the case of ejecting the disk 8 from the attaching section 3, the disk 8 is conveyed on center MC of the disk 8 at attaching position FP of the disk 8 in the direction of arrow D and guided by the slit opening section 7*d* and ejected from the disk insertion hole 2*a* on the panel member 2 in the direction of arrow E.

At this time, in the slit opening section 7*d* and the opening section 5*a* on the panel 5, there are provided no step portions interfering with the disk 8. Accordingly, the disk 8 can be smoothly ejected.

Due to the foregoing, even in the disk mechanism in which the center of the panel member 2 and that of the attaching section 3 are dislocated from each other, no users have a feeling of dislocation of the center. Therefore, the disk mechanism can be handled in the same manner as that of the disk mechanism in which the center of the panel member 2 and that of the attaching section 3 are not dislocated from each other.

The above contents are summarized as follows. The disk mechanism of the embodiment comprises: a panel member 2 having a substantially slit-shaped disk insertion hole 2*a* through which a disk 8 can be inserted from a surface 2*b* side to a back 2*c* side; and an attaching section 3 arranged on the back 2*c* side of the panel member 2, to which the inserted disk 8 is to be attached, wherein the attaching section 3 is attached to the panel member 2 under the condition that a center SC of the disk insertion hole 2*a* in the longitudinal direction and a center MC of the disk 8, which is attached to the attaching section 3, are dislocated from each other in the longitudinal direction of the disk insertion hole 2*a*, and the disk mechanism further comprises a guide face 11 which is a guide device for guiding the disk 8 toward a position, at which the attaching section 3 starts drawing the disk 8 according to the insertion of the disk 8.

Accordingly, in the disk mechanism of the above embodiment, even in the case where it is difficult for the attaching section 3 to be arranged on the panel member so that center SC of the disk insertion hole 2*a* and center MC of the disk 8, which is attached to the attaching section 3, can be made to coincide with each other, the disk insertion hole 2*a* can be arranged symmetrically to the right and left with respect to the panel member 2. Therefore, the panel member 2 can be designed with a feeling of stability.

Further, in the case of inserting the disk 8 into the disk insertion hole 2*a*, even when the disk 8 is inserted from any position in the disk insertion hole 2*a*, the position of the disk 8 can be automatically corrected to a position at which the attaching section 3 starts drawing the disk 8 into the machine.

Due to the foregoing, the disk mechanism can be handled in the same manner as that of the disk mechanism in which no dislocation is caused in the attaching section 3. Therefore, the operation property can be enhanced, and no users are given a sense of incongruity.

In this connection, the disk mechanism of the present invention is not limited to the above specific embodiment, and variations may be made without departing from the spirit and scope of the invention.

For example, in the embodiment described above, explanations are made into the guide face formed into the step portion composed of the end portion of the slit opening section and the end portion of the opening section. However, the guide face may be composed of a tapered face formed at the end portion of the slit opening section.

As long as the present invention can be accomplished, the material, profile, size, form, number and arrangement position of the disk, disk insertion hole, panel member, attaching section, guide device, guide face, opening section of the panel member and disk insertion hole member may be arbitrary and not limited to the specific embodiment.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A disk mechanism comprising:

a panel member having a substantially slit-shaped disk insertion hole through which a disk can be inserted from a surface side to a back side; and an attaching section including an attaching position to which the inserted disk is to be attached, arranged on a backside of the panel member, wherein:

the attaching section is attached to the panel member under the condition that a center of the disk insertion hole in the longitudinal direction and a center of the disk attached to the attaching section, are dislocated from each other in the longitudinal direction of the disk insertion hole; and the disk mechanism further comprising a guide face arranged at an end portion of the disk insertion hole in the longitudinal direction, the guide face guiding the disk toward the attaching position of the attaching section according to the insertion of the disk, wherein:

the guide face comprises a slit-shaped opening section integrally formed with the insertion hole;

the slit-shaped opening section has a longitudinal dimension less than that of the insertion hole.

2. The disk mechanism as claimed in claim 1, wherein the guide face dislocates the disk in the longitudinal direction of the disk insertion hole when the guide face comes into contact with an outer circumferential section of the disk.

3. The disk mechanism as claimed in claim 1, wherein the disk insertion hole is composed in such a manner that a disk insertion hole member is fixed to an opening section provided on the panel member.

4. The disk mechanism claimed in claim 1, wherein the guide face guides the disk in a direction parallel to a longitudinal direction of the panel member.

5. The disk mechanism claimed in claim 1, wherein the arrangement of the guide face at the end portion of the disk insertion hole provides a step-shaped interface therebetween.

6. A disk apparatus comprising:

an attaching section comprising an attaching position that supports a disk for data transmission; and a panel member comprising a substantially slit-shaped disk insertion hole through which the disk can be inserted along a first direction and then transported to the attaching position along the first direction, wherein:

a longitudinal center of the slit-shaped insertion hole is offset, in a second direction away from the first direction, from a center of the disk when the disk is at the attaching position; and the disk apparatus further comprising a guide face arranged at an end portion of the slit-shaped disk insertion hole, the guide face shaped to align the center of the disk in the second direction for transport to the attaching position, wherein:

the guide face comprises a slit-shaped opening section integrally formed with the slit-shaped insertion hole:

the slit-shaped opening section has a longitudinal dimension less than that of the slit-shaped insertion hole.

7. The disk apparatus according to claim 6, wherein the guide face aligns the disk in the second direction by contact with an outer edge of the disk.

8. The disk apparatus according to claim 6, wherein the slit-shaped disk insertion hole is fixed to an opening section provided on the panel member.

9. The disk apparatus according to claim 6, wherein the second direction and first direction are coplanar.

10. The disk apparatus according to claim 6, wherein the arrangement of the guide face at the end portion of the slit-shaped disk insertion hole provides a step-shaped interface therebetween.

* * * * *